(12) United States Patent
Kobayashi

(10) Patent No.: US 6,715,072 B1
(45) Date of Patent: Mar. 30, 2004

(54) SYSTEM FOR AUTOMATICALLY READING STORED REWRITING DATA AND REPLACING SYSTEM GENERATED SETUP DATA BY THE REWRITING DATA BEFORE SYSTEM INITIALIZATION

(75) Inventor: Isao Kobayashi, Matsumoto (JP)

(73) Assignee: Seiko Epson Corporation (JP)

( * ) Notice: Subject to any disclaimer, the term of this patent is extended or adjusted under 35 U.S.C. 154(b) by 500 days.

(21) Appl. No.: 09/666,699

(22) Filed: Sep. 21, 2000

(51) Int. Cl.⁷ .......................... G06F 1/24; G06F 15/177
(52) U.S. Cl. .............................. 713/100; 713/2
(58) Field of Search .................... 713/1, 2, 100; 711/100, 154, 161, 162, 170; 714/3, 6

(56) References Cited

U.S. PATENT DOCUMENTS 5,758,154 A * 5/1998 Qureshi .................. 713/1
6,405,309 B1 * 6/2002 Cheng et al. ............ 713/1

FOREIGN PATENT DOCUMENTS

JP          09034705 A  *  2/1997  ............ G06F/9/40

OTHER PUBLICATIONS

Rober E. Fine—"Recreating from Scratch"—Sep. 13, 1997—Newsgroups: comp.os.ms-windows.win95.misc.*

David Ripton—"Registry Misbehaving"—Sep. 16, 1997—Newsgroups: comps.os.ms-windows.win95.moderated.*

* cited by examiner

Primary Examiner—Thomas Lee
Assistant Examiner—Thuan Du
(74) Attorney, Agent, or Firm—Harness, Dickey & Pierce, P.L.C.

(57) ABSTRACT

A setup data rewriting device has a nonvolatile memory device that stores rewriting data including registry data. Before the operating system refers to the registry data, the rewriting data is read from the storage device and stored in a memory region of a RAM different from a region where the operating system generates the registry data. Also, before the operating system refers to the registry data, the rewriting data stored in the RAM is used to rewrite the registry data stored in the RAM to the registry data included in the rewriting data.

6 Claims, 3 Drawing Sheets

S100: Read in a loader.

S102: Read in a rewriting data file.

S104: Read is an execution file for operating system.

S106: Execute the program from a predetermined address.

S108: Initialize devices.

S110: Generate registory data.

S112: Rewrite the registory data, using rewriting data.

S114: Refer to the registory data and install the device drivers.

Fig.3(a)  Fig. 3(b)  Fig. 3(c)
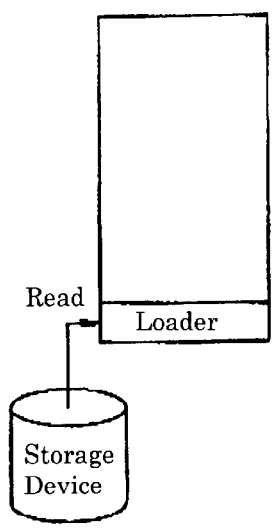
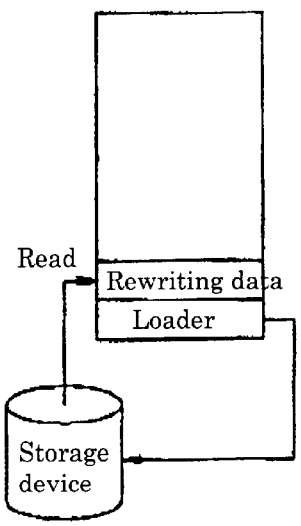
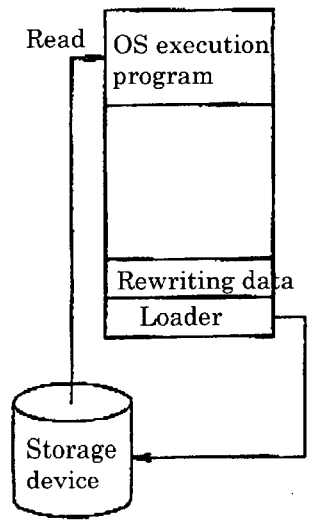
Fig. 3(d)  Fig. 3(e)  Fig. 3(f)
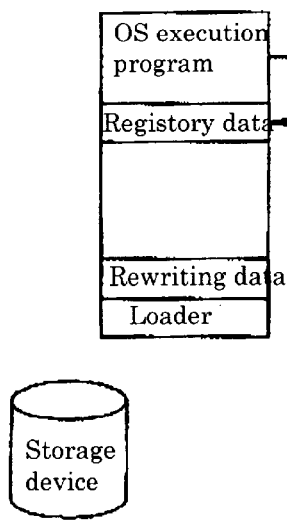
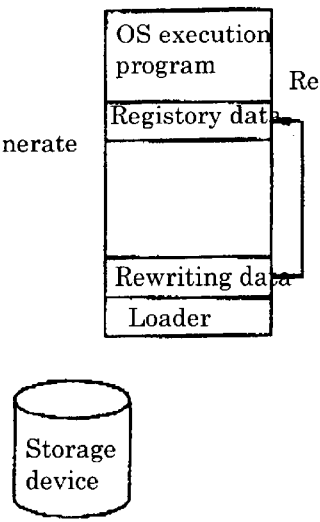
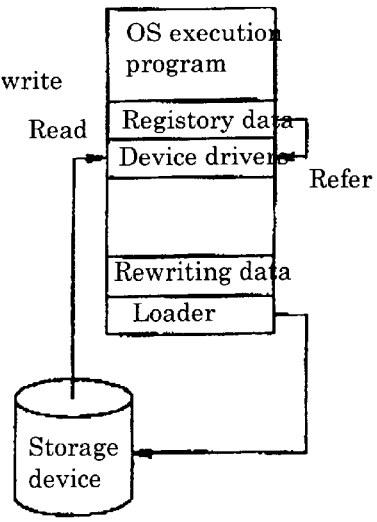

SYSTEM FOR AUTOMATICALLY READING STORED REWRITING DATA AND REPLACING SYSTEM GENERATED SETUP DATA BY THE REWRITING DATA BEFORE SYSTEM INITIALIZATION

BACKGROUND OF THE INVENTION

1. Technical Field

The present invention relates to an apparatus and a storage media that are used, upon starting up a computer, to generate registry data of computer setting in a RAM and install the generated registry data in an operating system that refers to the registry data. In particular, in a system that requires a power shut down, the present invention relates to a setup data rewriting apparatus, a setup data rewriting system and a storage media that stores a setup data rewriting program in which registry data can be accurately and readily changed.

2. Discussion

Conventionally, an operating system that is installed in a mobile computer or a card computer, such as Windows CE (Registered Trademark), generates registry data for setting up a computer in a RAM upon start-up, and refers to the generated registry data when device drivers are installed or the system is operated.

However, since the conventional operating system described above generates registry data in the RAM upon start-up, the computer is always set up based on the initial data that is previously installed in the operating system, when the computer is powered on. Therefore, in order to set up the computer to a user fs desired setting, the user is required to change the registry data to his desired setting after the startup. Alternatively, when a program that is required to execute the operating system is generated, registry data for the desired setting needs to be installed.

However, when the registry data is modified after the startup, a relatively long time is required for such a modification work because the registry data is enormous. Also, unlike Windows 95 or 98 (Registered Trademark), the above described operation system reads a single execution file of several megabytes (MB) into a RAM at a predetermined address, and directly executes the program from the address. Therefore, even the registry data is changed after startup, it is difficult to write the changed registry data in the execution file. Accordingly, in order to maintain the user fs desired computer setting, the computer needs to be continuously operated without shutting down the power after the registry data is changed. Alternatively, the registry data needs to be changed at each startup. The former cannot be applied to a system that requires a power shut down, and the latter not only requires a substantial amount of work and time, but also may result in erroneous setting of the registry data.

Also, when a program that is required to execute the operating system is generated, a substantial amount of time is required to generate the program when the registry data for the desired setting is installed. In particular, when systems that install an operating system are provided to many users, a program needs to be generated for each individual user. It requires a substantial amount of time for the works to generate the programs.

Therefore, the present invention has been made in view of the unsolved problems of the prior technique. It is an object of the present invention to provide a setup data rewriting apparatus, a setup data rewriting system and a storage media that stores a setup data rewriting program that can correctly and readily change the setup data for a system that requires a power shut down.

SUMMARY OF THE INVENTION

To achieve the object described above, a setup data rewriting apparatus, in accordance with the present invention, includes a first storage device, and generates setup data in the first storage device and applies the generated setup data to a system that refers to the setup data when the system is operated. The setup data rewriting apparatus reads rewriting data for rewriting the setup data in the first storage device before the system refers to the setup data, and rewrites the setup data in the first storage device by using the rewriting data in the first storage device.

With the structure described above, the rewriting data is read in the first storage device before the system refers to the setup data, and the setup data in the first storage device is rewritten by using the rewriting data in the first storage device. Then, upon operating the system, the system refers to the setup data that has been rewritten.

In the invention, the rewriting data is read or the setup data is rewritten before the system refers to the setup data. It is noted that, for example, reading the rewriting data and rewriting the setup data can be performed after the system generates the setup data. However, in view of ready installation of the rewriting data in the operating system, they may preferably be performed before the system generates the setup data.

Also, the invention is not limited to a system that generates registry data upon startup, and refers to the generated registry data for its operation, but is also applicable to any systems that generate setup data upon startup, and refer to the generated setup data for their operation.

Furthermore, the setup data rewriting apparatus, in accordance with the invention further comprises a non-volatile second storage device that stores the rewriting data. Before the system refers to the setup data, the setup data rewriting apparatus reads the rewriting data from the second storage device, stores the rewriting data in a region in the first storage device that is different from a region where the system is to generate the setup data, and rewrites the setup data in the first storage device by using the rewriting data in the first storage device.

With the structure described above, before the system refers to the setup data, the rewriting data is read from the second storage device and stored in a storage region in the first storage device that is different from a region where the system is to generate the setup data, and the setup data in the first storage device is rewritten by using the rewriting data in the first storage device.

It is noted that the second storage device stores rewriting data by any means and at any time. Therefore, the second storage device may store the rewriting data in advance, or may store the rewriting data when the apparatus is in operation. It is noted that the first storage device may be a non-volatile type or a volatile type.

Furthermore, in the setup data rewriting apparatus in accordance with the invention, the rewriting data includes the setup data. The setup data rewriting apparatus further includes a reading device that reads the rewriting data from the second storage, and stores the rewriting data in a memory region in the first storage device that is different from a region where the system is to generate the setup data, and a rewriting device that rewrites the setup data in the first storage device to the setup data included in the rewriting data by using the rewriting data in the first storage device, wherein reading by the reading device and rewriting by the rewriting device are performed before the system generates setup data.

With the structure described above, before the system refers to the setup data, the reading device reads the rewriting data from the second storage, and stores the rewriting data in a memory region in the first storage device that is different from a region where the system is to generate the setup data, and the rewriting device rewrites the setup data in the first storage device to the setup data included in the rewriting data by using the rewriting data in the first storage device.

Also, the setup data rewriting apparatus, in accordance with the present invention, includes a first storage device, and generates setup data for setting up a computer in the first storage device and applies the generated setup data to an operating system that refers to the setup data when the operating system is operated. The setup data rewriting apparatus includes a non-volatile second storage device that stores rewriting data for rewriting the setup data, the rewriting data including the setup data, a reading device that reads the rewriting data from the second storage, and stores the rewriting data in a region in a memory region of the first storage device that is different from a region where the operating system is to generate the setup data, and a rewriting device that rewrites the setup data in the first storage device to the setup data included in the rewriting data by using the rewriting data in the first storage device. The reading device performs reading before the operating system generates setup data and the rewriting device performs rewriting before the operating system generates setup data.

With the structure described above, before the operating system generates setup data, the reading device reads the rewriting data from the second storage, and stores the rewriting data in a region in a memory region of the first storage device that is different from a region where the operating system is to generate the setup data, and the rewriting device rewrites the setup data in the first storage device to the setup data included in the rewriting data by using the rewriting data in the first storage device. When the operating system operates, the operating system refers to the rewritten setup data.

Also, in order to achieve the object, a system in accordance with the present invention includes the setup data rewriting apparatus and the operating system, wherein the operating system refers for its operation to the setup data that is rewritten by the setup data rewriting apparatus.

With the structure described above, the setup data rewriting apparatus changes the setup data in the first storage device to the setup data included in the rewriting data by using the rewriting data in the first storage device, and the operating system refers to the rewritten setup data.

Also, in order to achieve the object, a computer readable storage device, in accordance with the present invention, comprises a first storage device and a non-volatile second storage device that stores rewriting data for rewriting setup data, in which the rewriting data including the setup data. The computer readable storage device stores a program for generating the setup data for setting up a computer in the first storage device and applying the generated setup data to an operating system that refers to the setup data when the operating system is operated. The computer readable storage device stores a setup data rewriting program that makes a computer to execute step of reading the rewriting data from the second storage device and storing the rewriting data in a region in a memory region of the first storage device that is different from a region where the operating system is to generate the setup data before the operating system generates setup data, and step of rewriting the setup data in the first storage device to the setup data included in the rewriting data by using the rewriting data in the first storage device before the operating system refers to setup data.

With the structure described above, when the data stored in the storage device is read by the computer, and the computer is operated based on the data read out, the same effects provided by the setup data rewriting apparatus can be obtained.

BRIEF DESCRIPTION OF THE DRAWINGS

FIGS. 3(a)–3(f) show storage statuses of RAM.

DETAILED DESCRIPTION OF THE PREFERRED EMBODIMENTS

Figure 1:
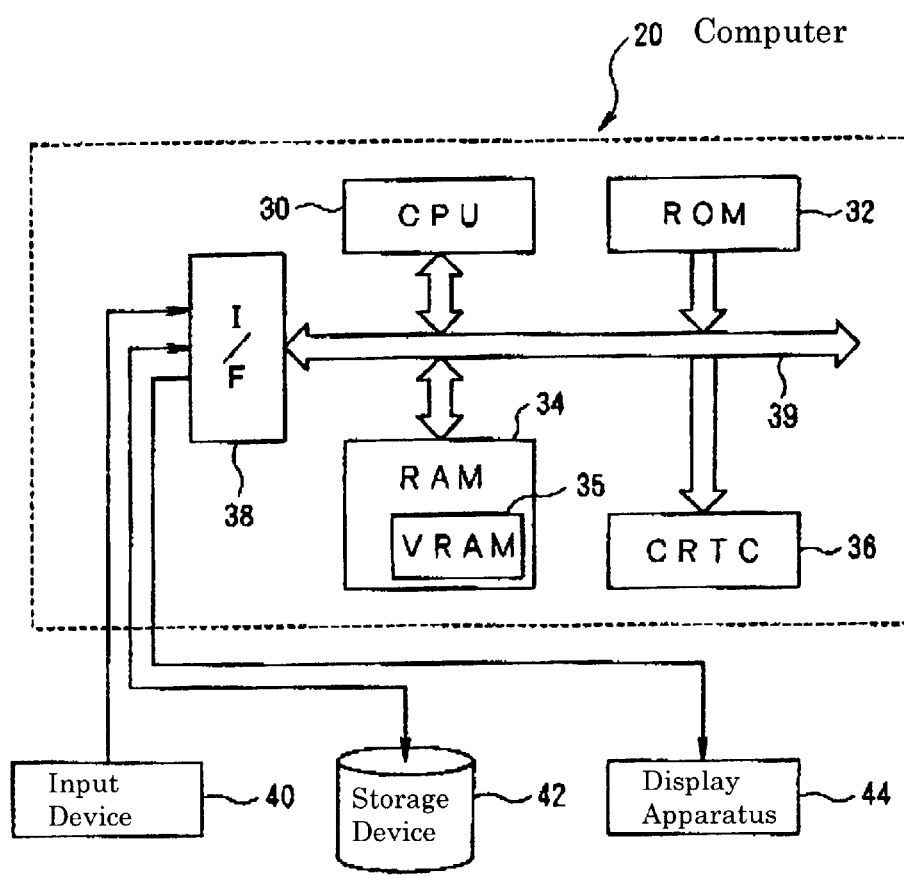
FIG. 1 shows a block diagram of a computer that is a card computer.

Embodiments of the present invention will be described below with reference to the accompanying drawings. FIGS. 1 and 3 show setup data rewriting apparatuses in accordance with embodiments of the present invention.

In accordance with the embodiments of the present invention, a setup data rewriting apparatus is applied to an operating system, like Windows CE, that generates registry data in a RAM upon startup, and refers to the generated registry data when device drivers are installed or the operating system is operated. As shown in FIG. 1, the operating system is installed in a computer 20 that is a card computer.

First, a structure of a system in which a setup data rewriting apparatus of the present invention is applied will be described below with reference to FIG. 1. FIG. 1 is a block diagram of the computer 20, that is a card computer.

As shown in FIG. 1, the computer 20 includes devices, such as, a CPU 30 that operates and controls the entire system based on a control program, a ROM 32 that stores in a predetermined region thereof the control program for controlling the CPU 30, a RAM 34 that stores data read out from the ROM 32 and operation results required during the operation process by the CPU 30, a CRTC 36 that converts data stored in a predetermined region of the RAM 34 into an image signal and outputs thereof, and an I/F 38 that handles input and output of data with respect to external apparatuses. The devices are mutually connected by a bus 39 that is a signal line for transferring data in a manner that data can be sent and received.

The I/F 38 connects to external devices, such as, an input device 40 including a keyboard, a mouse or the like that functions as a man-machine interface and enables inputting data, a non-volatile storage device 42 that stores data and tables as files, and a display device 44 including an LCD, a CRT or the like that displays an image based on image signals.

The RAM 34 has VRAM 35 in a specified region thereof to store display data for displaying on the display device 44. The VRAM 35 is independently accessible by the CPU 30 and the CRTC 36.

The CRTC 36 successively reads out the display data stored in the VRAM 35 at a predetermined cycle, and converts the read display data into image signals and outputs the signals to the display device 44.

The storage device 42 stores a program required to execute the operating system which is a single execution file of several megabytes, a rewriting data file that is composed of rewriting data for rewriting the registry data, loaders that read in other files and device drivers that control devices. The rewriting data file includes registry data that sets up the computer to specified settings desired by the user. In the rewriting data file, the rewriting data is stored in a text format.

Figure 2:
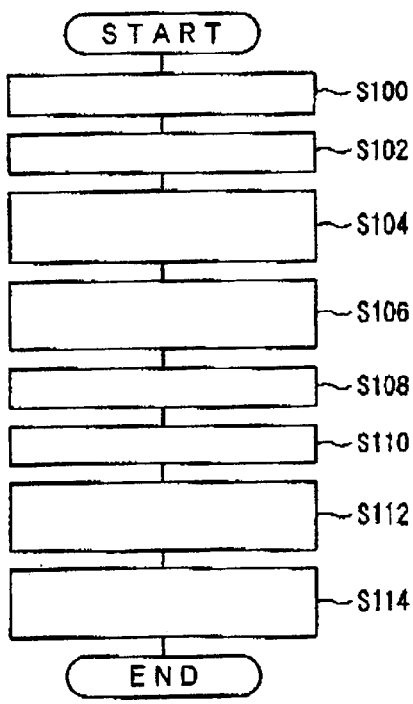
FIG. 2 shows a flow chart of a startup process.

The CPU 30 is composed of a microprocessing unit MPU or the like. When the power is turned on, the CPU 30 starts a predetermined program stored in a predetermined region in the ROM 32, and a starting process is executed according to the program in a manner shown in the flow chart of FIG. 2. FIG. 2 shows a flow chart of the starting process.

When the starting process is executed by the CPU 30, step S100 is started, as shown in FIG. 2.

In step S100, a loader for reading a file is read from the storage device 42 and stored in a pretended region of the RAM 34. In step S102, by the loader, a rewriting data file is read from the storage device 42, and the rewriting data is stored in a predetermined region of the RAM 34, and then step S104 is executed. More specifically, in step 102, upon storing the rewriting data in the RAM 34, the rewriting data in a text format is converted to a binary file, and then stored in the RAM 34.

In step S104, by the loader, an execution file for the operating system is read from the storage device 42 and the execution program is stored in a predetermined region of the RAM 34. Then, in step S106, the program is executed from a predetermined address among the addresses of the RAM 34 that stores the execution program. Then, step S108 is executed to initialize the devices, and then step S110 is executed.

In step S110, registry data is generated at a predetermined region of the RAM 34 based on initialization data that is implemented in the execution program. In step S112, the registry data stored in the RAM 34 is rewritten to registry data that is included in the rewriting data stored in the RAM 34 by using the rewriting data in the RAM 34, and then step S114 is executed. More particularly, in step S112, by the loader, an execution file that is composed of a rewriting program for execution of rewriting of the registry data by using the rewriting data is read, and the rewriting program is stored in a predetermined region of the RAM 34. By the rewriting program, the registry data stored in the RAM 34 is rewritten to registry data that is included in the rewriting data by using the rewriting data stored in the RAM 34.

In step S114, the registry data stored in the RAM 34 is referred to thereby install device drivers, and a series of processes is thus completed.

Next, an operation of the above-described embodiment will be described with reference to FIG. 3. FIG. 3 shows states of storage of the RAM 34.

When the computer 20 is powered on, a specified program stored in a predetermined region of the ROM 32 is started by the CPU 30, and the startup process is executed according to the program.

When the startup process is executed, first, in step S100, a loader is read from the storage device 42. Then, as shown in FIG. 3(a), the loader is stored in a predetermined region of the RAM 34. Then, in step S102, a rewriting data file is read from the storage device 42 by the loader, and as shown in FIG. 3(b), the read rewriting data file is stored in a predetermined region of the RAM 34.

Then, in step S104, an execution file for the operating system is read from the storage device 42. As shown in FIG. 3(c), an execution program of the read execution file is stored in a predetermined region of the RAM 34. Then, in step S106 through step S110, the program is executed from a predetermined address among addresses of the RAM 34 that stores the execution program, and devices are initialized by the operating system. Then, as shown in 3(d), registry data is generated in a predetermined region of the RAM 34 based on initialization data implemented in the execution program.

Then, in step S112, the registry data stored in the RAM 34 is rewritten to the registry data included in the rewriting data by using the rewriting data stored in the RAM 34, as shown in 3(e). Then, the operating system refers to the registry data of the RAM 34, as shown in FIG. 3(f), and installs the device drivers. Then, the operating system installs a GUI, a shell and the like, and the startup operation of the operating system is completed.

In this manner, the present embodiment is equipped with the volatile storage device 42 that stores rewriting data including registry data. Before the operating system refers to the registry data, the rewriting data is read from the storage device 42 and stored in a region of the RAM 34 different from a region thereof where the operating system generates registry data, and the registry data stored in the RAM 34 is rewritten to the registry data included in the rewriting data by using the rewriting data stored in the RAM 34.

Accordingly, by storing rewriting data that includes registry data for settings desired by the user in the storage device 42, the computer is always set to the settings desired by the user without modifying the registry data at each startup. Therefore, the time required to modify the registry data is reduced, and the possibility to erroneously set the registry data is reduced. Also, when systems that implement an operating system are provided to many users, only rewriting data that includes registry data for each user may be generated. Therefore, the time required for the data generation work is reduced compared to the conventional technology.

Moreover, in accordance with the present embodiment, before the operating system refers to the registry data, the rewriting data is read from the storage device 42 and stored in a memory region of the RAM 34 different from a region thereof where the operating system is to generate registry data.

It is noted that, after the operating system is started, the processing contents of the operating system are complicated and difficult to analyze, and therefore it is difficult to add a program that is created by the user. In this respect, the rewriting data is read before the operating system starts up, such that the data can be readily installed in the operating system.

It is noted that, in the above-described embodiment, whenever any one of the processes shown in the flowchart of FIG. 2 is executed, the control program stored in advance in the ROM 32 is executed. However, the present invention is not limited to this embodiment. For example, a program representing the processes may be stored in a storage device, and the program may be read into the RAM 34 and then executed.

The storage device described above includes semiconductor storage media, such as RAM and ROM, magnetic storage type memory media, such as FD and HD, optically readable storage memory media, such as CD, CDV, LD and DVD, and magnetic storage/optically readable storage media such as MO. Therefore, the storage device includes any type of computer readable storage media without regard to the reading methods including electronic, magnetic, and optical reading methods.

In the above-described embodiment, the registry data corresponds to setup data. The RAM 34 corresponds to a first storage device. The storage device 42 corresponds to a second storage device. Step S102 corresponds to reading means. Step S112 corresponds to rewriting means.

As described above, by a setup data rewriting device in accordance with the present invention, setup data can be accurately and readily modified in a system that requires a power shut down compared to the conventional technique.

Furthermore, by a setup data rewriting device in accordance with the present invention, setup data can be readily installed in an operating system.

Moreover, by a system in accordance with the present invention, setup data can be accurately and readily modified in a system that requires a power shut down compared to the conventional technique.

Furthermore, by a storage media that stores a setup data rewriting program in accordance with the present invention, setup data can be accurately and readily modified in a system that requires a power shut down compared to the conventional technique.

What is claimed is:

1. A setup data rewriting apparatus comprising a first storage device, for generating setup data in the first storage device and applying the generated setup data to a system that refers to the setup data when the system is operated, characterized in that rewriting data for rewriting the setup data is automatically read in the first storage device before the system refers to the setup data, and the setup data in the first storage device is automatically rewritten by using the rewriting data in the first storage device after the system generates the setup data and before the system refers to the setup data.

2. A setup data rewriting apparatus according to claim 1, further comprising a non-volatile second storage device that stores the rewriting data, wherein, before the system refers to the setup data, the rewriting data is read from the second storage device and is stored in a region in the first storage device that is different from a region where the system is to generate the setup data, and the setup data in the first storage device is rewritten by using the rewriting data in the first storage device.

3. A setup data rewriting apparatus according to claim 1, wherein the rewriting data includes the setup data, the setup data rewriting apparatus further comprising a reading device that reads the rewriting data from the second storage, and stores the rewriting data in a region in the first storage device that is different from a region where the system is to generate the setup data, and a rewriting device that rewrites the setup data in the first storage device to the setup data included in the rewriting data by using the rewriting data in the first storage device, wherein reading by the reading device and rewriting by the rewriting device are performed before the system generates setup data.

4. A setup data rewriting apparatus including a first storage device, for generating setup data for computer setting in the first storage device and applying the generated setup data to an operating system that refers to the setup data when the operating system is operated, the apparatus comprising:

a non-volatile second storage device that stores rewriting data for rewriting the setup data, the rewriting data including setup data;

a reading device that reads the rewriting data from the second storage device, and stores the rewriting data in a region in a memory region of the first storage device that is different from a region where the operating system is to generate the setup data; and a rewriting device that rewrites the setup data in the first storage device to the setup data included in the rewriting data by using the rewriting data in the first storage device, wherein the reading device automatically performs reading before the operating system generates setup data and the rewriting device automatically performs rewriting before the system refers to the setup data.

5. A system comprising the setup data rewriting apparatus and the operating system according to claim 4, wherein the operating system refers for operation thereof to the setup data that is rewritten by the setup data rewriting apparatus.

6. A computer readable storage device comprising a first storage device and a non-volatile second storage device that stores rewriting data for rewriting setup data, the rewriting data including setup data, the computer readable storage device storing in the first storage device a program for generating the setup data for setting up a computer and applying the generated setup data to an operating system that refers to the setup data when the operating system is operated, wherein the computer readable storage device stores a setup data rewriting program that makes a computer execute a step of automatically reading the rewriting data from the second storage device and storing the rewriting data in a memory region of the first storage device that is different from a region where the operating system is to generate the setup data before the operating system generates setup data and a step of automatically rewriting the setup data in the first storage device to the setup data included in the rewriting data by using the rewriting data in the first storage device before the operating system refers to setup data.

\* \* \* \* \*

UNITED STATES PATENT AND TRADEMARK OFFICE
CERTIFICATE OF CORRECTION

PATENT NO. : 6,715,072 B1
DATED : March 30, 2004
INVENTOR(S) : Kobayashi

It is certified that error appears in the above-identified patent and that said Letters Patent is hereby corrected as shown below:

Column 1,
Line 45, after "even" insert -- if --

Column 3,
Line 58, "including" should be -- includes --

Column 5,
Line 17, "pretended" should be -- predetermined --
Line 21, "step 102" should be -- step S102 --
Line 49, "referred" should be -- rewritten --

Column 6,
Lines 6 and 13, after "in" insert -- FIG. --

Signed and Sealed this

Twenty-seventh Day of July, 2004

JON W. DUDAS
*Acting Director of the United States Patent and Trademark Office*